(12) United States Patent
Hayes et al.

(10) Patent No.: US 10,315,060 B2
(45) Date of Patent: Jun. 11, 2019

(54) PRESSURE INDICATING FIRE SPRINKLER DEVICE

(71) Applicants: Scott Hayes, Fort Worth, TX (US); Jerry Minter, Irving, TX (US)

(72) Inventors: Scott Hayes, Fort Worth, TX (US); Jerry Minter, Irving, TX (US)

(*) Notice: Subject to any disclaimer, the term of this patent is extended or adjusted under 35 U.S.C. 154(b) by 0 days.

(21) Appl. No.: 15/785,859

(22) Filed: Oct. 17, 2017

(65) Prior Publication Data

US 2019/0111293 A1    Apr. 18, 2019

(51) Int. Cl.

| | |
|---|---|
| *G01L 9/00* | (2006.01) |
| *A62C 37/50* | (2006.01) |
| *G08B 21/18* | (2006.01) |
| *A62C 13/76* | (2006.01) |

(52) U.S. Cl.
CPC .............. *A62C 37/50* (2013.01); *G01L 9/00* (2013.01); *G01L 9/0001* (2013.01); *A62C 13/76* (2013.01); *G08B 21/18* (2013.01)

(58) Field of Classification Search
CPC ......... A62C 37/50; A62C 13/76; A62C 35/58; G01L 19/086; G01L 9/00; G08B 21/18; G01F 1/363; G01F 1/38; G01F 1/42; G01M 3/2815
See application file for complete search history.

(56) References Cited

U.S. PATENT DOCUMENTS

| | | | | |
|---|---|---|---|---|
| 4,099,573 A | * | 7/1978 | Sahara | A62C 37/50 169/23 |
| 4,618,001 A | * | 10/1986 | Hoening | A62C 37/12 169/23 |
| 2016/0054158 A1 | * | 2/2016 | MacKenzie | A62C 35/62 73/49.5 |

* cited by examiner

*Primary Examiner* — Benyam Haile
(74) *Attorney, Agent, or Firm* — Law Office of Jeff Williams PLLC; J. Oliver Williams

(57) ABSTRACT

A device and method for verifying the readiness of a building's fire sprinkler system. The device includes an adapter that is secured between the sprinkler pipe and the sprinkler assembly, a pressure switch to measure the fluid pressure in the fire sprinkler system, an indicator which notifies occupants if there is enough fluid pressure at the sprinkler assembly for the sprinkler to operate properly, and a power source for the pressure switch and indicator. During operation of the sprinkler system, water flows from the sprinkler pipe, through the adapter and into the sprinkler assembly.

16 Claims, 6 Drawing Sheets

PRESSURE INDICATING FIRE SPRINKLER DEVICE

BACKGROUND

1. Field of the Invention

The present application relates to a fire sprinkler device, and more particularly to a device used to indicate if a fire sprinkler has water pressure.

2. Description of Related Art

The desire to protect life and property from a fire has been held by people for ages. Various different methods of protecting life and property from a fire have been imagined and used. For example, today we have various types of fire extinguishers, fire sprinkler systems, and even firemen to protect lives and property from fires. Each of these examples have advantages and disadvantages.

The advantage of a fireman is that firemen frequently check their equipment to insure it will work when needed. The disadvantage firemen have always had is the amount of time it takes to respond to a reported fire. Precious minutes are lost while waiting for firemen to respond to a fire. Time in which the fire grows in intensity and human lives can be lost.

To help with the fireman's delay in arriving, fire extinguishers were created to provide people a means to fight a fire while waiting for firemen to arrive at the scene. The advantage of a fire extinguisher is that it is present at the site of the fire. Additionally, a person can check the extinguisher to verify it will work when needed. The fire extinguishers disadvantage is a person must be at the location of the fire. A person must also be trained on how to use the extinguisher. The fire extinguisher can only be used for a brief amount of time and is not reusable. The brief amount of time a fire extinguisher can be used means it is effective only to put out small fires or to provide a path through the fire for people to escape through.

To help with the deficiencies associated with fire extinguishers, fire sprinkler systems were developed. The advantages of a fire sprinkler system are it can fight a larger fire than the extinguisher and the fire sprinkler system does not need a person at the scene of the fire to operate. The current fire sprinkler systems disadvantage is it is very difficult for a person to verify the water pressure at each individual sprinkler assembly. The system's water pressure is checked selected locations within the piping but does not verify the water pressure in each branch of the water lines. If there is no water at the sprinkler assembly, or insufficient water pressure, the sprinkler assembly will not properly function in putting out a fire and the fire can quickly grow out of control and endanger human life.

Although strides have been made to provide a means to check the water pressure status of a fire sprinkler system before a fire, considerable short comings remain. It is desirable for a person to be able to quickly and accurately check each fire sprinkler assembly to verify it has adequate water pressure.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
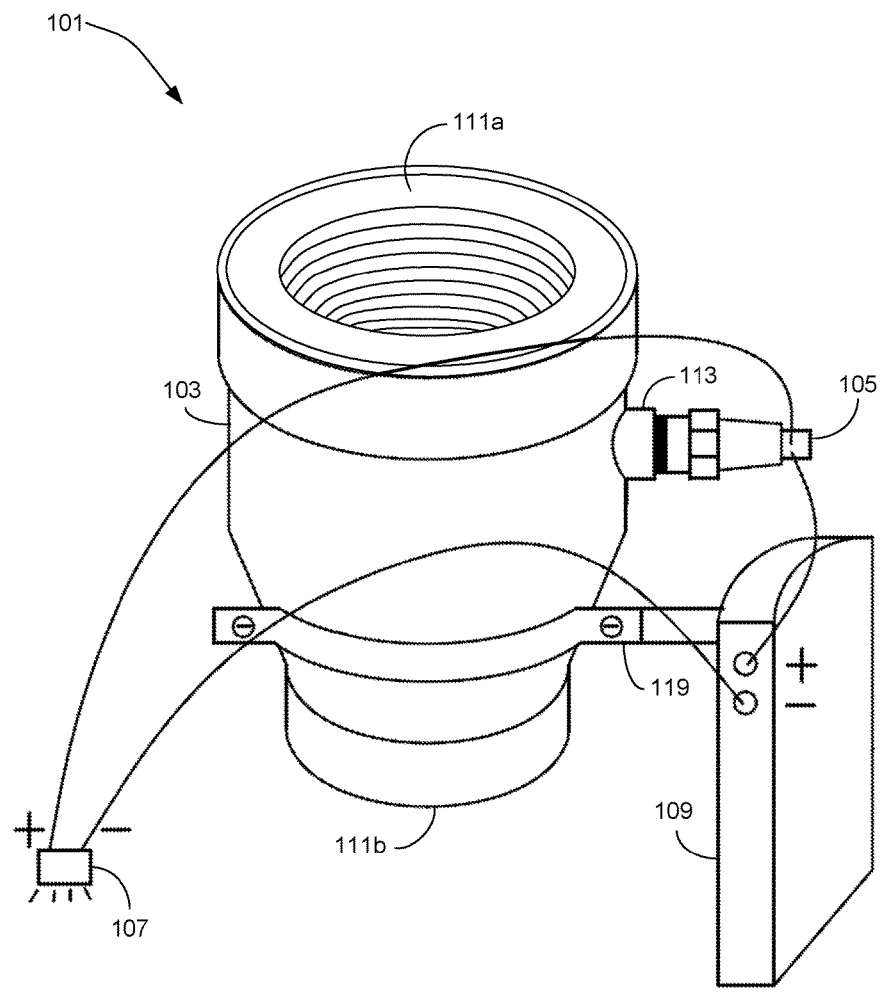
FIG. 1 is a perspective side view of a pressure indicating fire sprinkler device according to an embodiment of the present application.

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with traditional fire sprinkler systems. In particular, the device is configured to operate without any modification to the sprinkler pipe or the manufactured sprinkler. The device is configured to be installed between the sprinkler pipe and the manufactured sprinkler. These and other unique features of the device are discussed below and illustrated in the accompanying drawings.

The device and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The device and method of the present application is illustrated in the associated drawings. The device includes an adapter installed between a sprinkler pipe and a manufactured sprinkler. A pressure switch is in communication with the adapter and measures the fluid pressure inside the adapter. A power source is in electrical communication with the pressure switch and an indicator. The indicator is configured to provide a notification corresponding to the measured fluid pressure in the adapter. Additional features and functions of the device are illustrated and discussed below.

Referring now to the drawings wherein like reference characters identify corresponding or similar elements in form and function throughout the several views. FIG. 1 illustrates a perspective side view of a pressure indicating fire sprinkler device 101 of the present application. Device 101 comprises an adapter 103, a pressure switch 105, an indicator 107, and a power source 109. Device 101 is configured to provide a user information on the fluid pressure inside the adapter 103.

Figure 2:
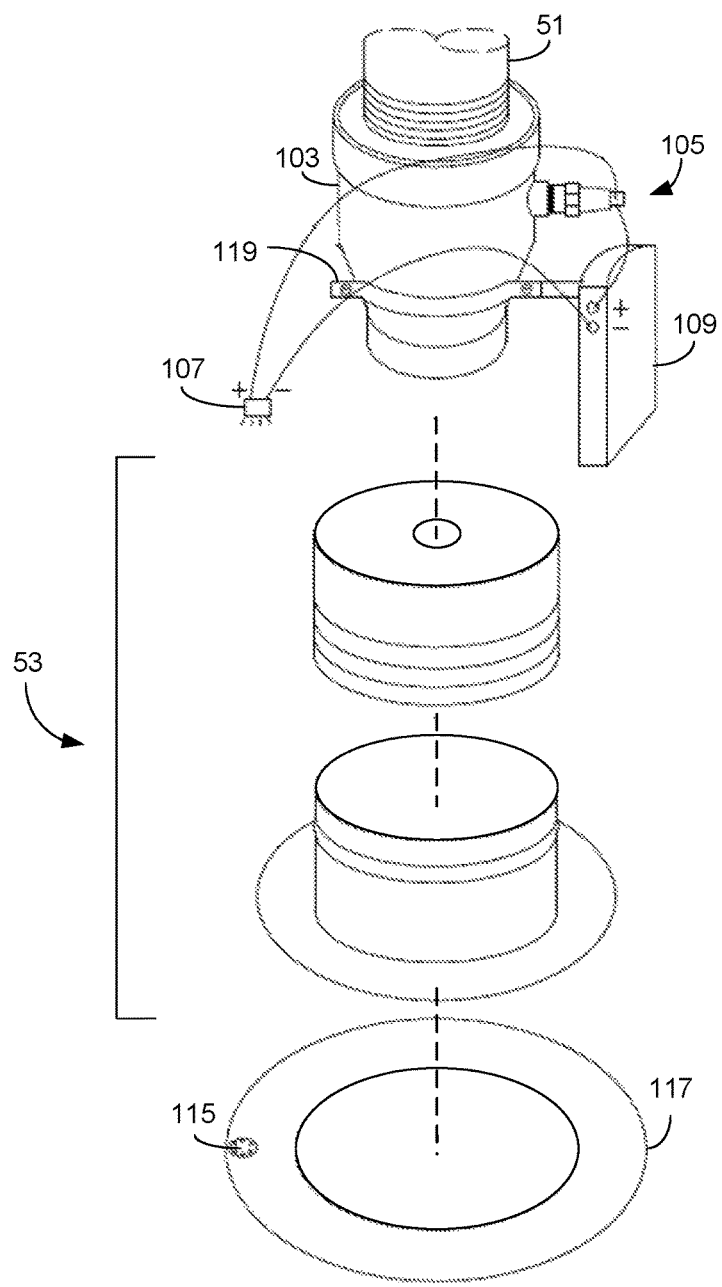
FIG. 2 is a partially exploded side view of the pressure indicating fire sprinkler device of FIG. 1 as viewed with a manufactured sprinkler assembly.

Referring now also to FIG. 2 in the drawings, a partially exploded side view of the pressure indicating fire sprinkler device 101 is illustrated. Adapter 103 is releasably coupled to a sprinkler system pipe 51 at a pipe end 111*a*. Also, adapter 103 is releasably coupled to a manufactured sprinkler assembly 53 at a sprinkler end 111*b*. As shown, adapter 103 is straight and pipe end 111*a* and sprinkler end 111*b* are at opposite ends of adapter 103. In other configurations, adapter 103 may have an angle between ends 111*a* and 111*b* due to the position of the sprinkler system pipe 51 and the proper positioning of manufactured sprinkler assembly 53. Adapter 103 is releasably coupled to sprinkler system pipe 51 and manufactured sprinkler assembly 53 through any known communication method; for example: magnetism, a threaded connection, soldering or a quick release coupling. Adapter 103 allows water to flow from the sprinkler system pipe 51 to manufactured sprinkler assembly 53. The purpose of adapter 103 is to provide a space for pressure switch 105 to measure the fluid pressure in the fire sprinkler system.

Pressure switch 105 communicates with adapter 103 through a port 113. Port 113 allows pressure switch 105 to measure the fluid pressure inside adapter 103. It is understood that pressure switch 105 and port 113 are releasably coupled through any known attachment method; for example, a threaded connection, soldering or a quick release coupling. Pressure switch 105 is also in electrical communication with the power source 109 and the indicator 107. The pressure switch 105 selectively provides a signal to the indicator 107. The signal either represents that the fluid in the adapter 103 is at or above a set fluid pressure defined by the operational parameters of the manufactured sprinkler assembly 53. It is also understood that the signal could also represent that the fluid pressure in adapter 103 is below the set fluid pressure. Pressure switch 105 can also be configured to send continuous signals to indicator 107, indicating the current fluid pressure in adapter 103.

Indicator 107 is configured to provide a notification corresponding to the measured fluid pressure in the adapter 103. The notification may be in the form of an audible sound, some type of light, a numerical display, some type of pressure gauge, or any other type of notification which would provide a user with necessary information regarding the fluid pressure. Indicator 107 is in electrical communication with pressure switch 105 and power source 109. Indicator 107 may also be in physical communication with pressure switch 105 if a pressure gauge is used.

Optionally, a ceiling plate 117 is releasably coupled to the indicator 107. Ceiling plate 117 is configured to cover a portion of the power source and optionally has an aperture 115. Aperture 115 permits the inspection of indicator 107. Aperture 115 is configured to allow the signal from indicator 107 to pass through the ceiling plate 117.

Power source 109 provides the electrical power to the pressure switch 105 and the indicator 107 through electrical communication. Power source 109 can provide either alternating current or direct current. Power source 109 is depicted as a battery which is in communication with the adapter 103 through an attachment device 119. It is understood that the battery can be a one-time use battery or a rechargeable battery. It is understood that power source 109 can be spatially orientated in any manner necessary so as to provide electrical power to the pressure switch 105 and the indicator 107. Additionally, power source 109 is not limited to a battery, but can be any item which can provide power to pressure switch 105 and indicator 107. This includes the building electrical wiring. If power source 109 is the building electrical wiring, it is understood that attachment device 119 is optional. The purpose of attachment device 119 is to secure and stabilize power source 109 in a set location. Attachment device 119 is shown as a bracket, but is not limited to a bracket. Attachment device 119 may consist of any item which can be securely communicated to one item while holding another item, like a clamp, for example.

Figure 3:
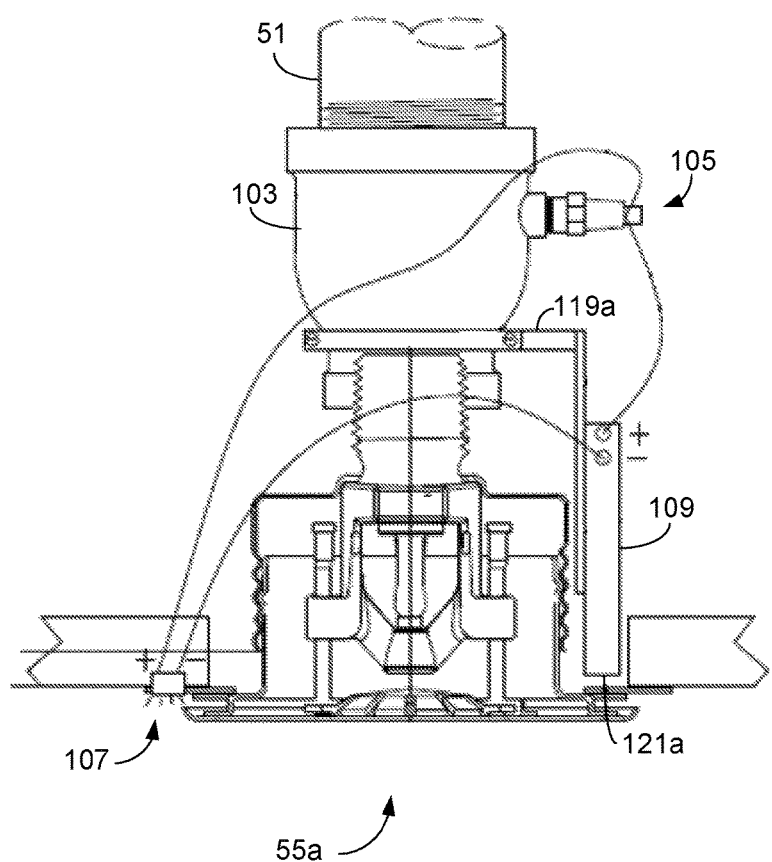
FIG. 3 is a side view of the pressure indicating fire sprinkler device of FIG. 1, connected to an exemplary concealed sprinkler.
Figure 4:
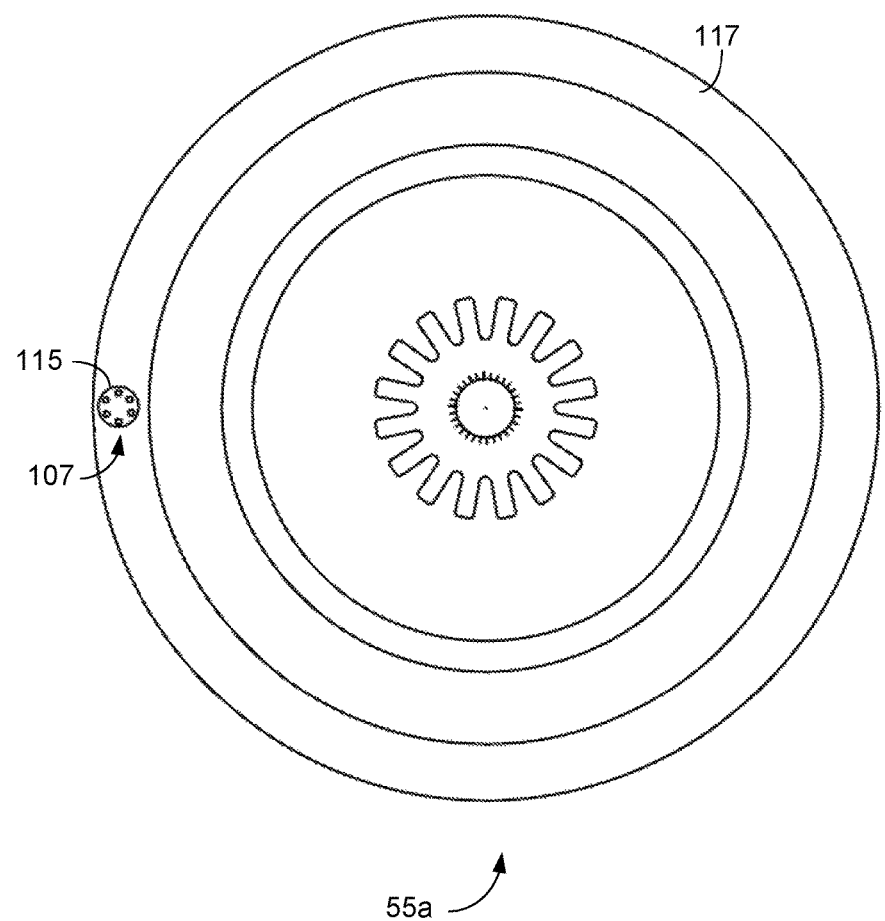
FIG. 4 is a bottom view of the pressure indicating fire sprinkler device and exemplary concealed sprinkler of FIG. 3.

Referring now also to FIGS. 3-4 in the drawings, a side and bottom view of the pressure indicating fire sprinkler device 101 connected to a concealed sprinkler 55*a* are illustrated. Here, the pipe end 111*a* and sprinkler end 111*b* are both female ends. It is understood that in other embodiments, pipe end 111*a* or sprinkler end 111*b* may be a male end. The location of power source 109 is shown relative to the concealed sprinkler 55*a*. Power source 109 is in communication with an attachment device 119*a* configured to secure power source 109 adjacent to concealed sprinkler 55*a* and below the elevation of sprinkler end 111*b*. Attachment device 119*a* is configured to locate power source 109 near a battery access point 121*a*.

Figure 5:
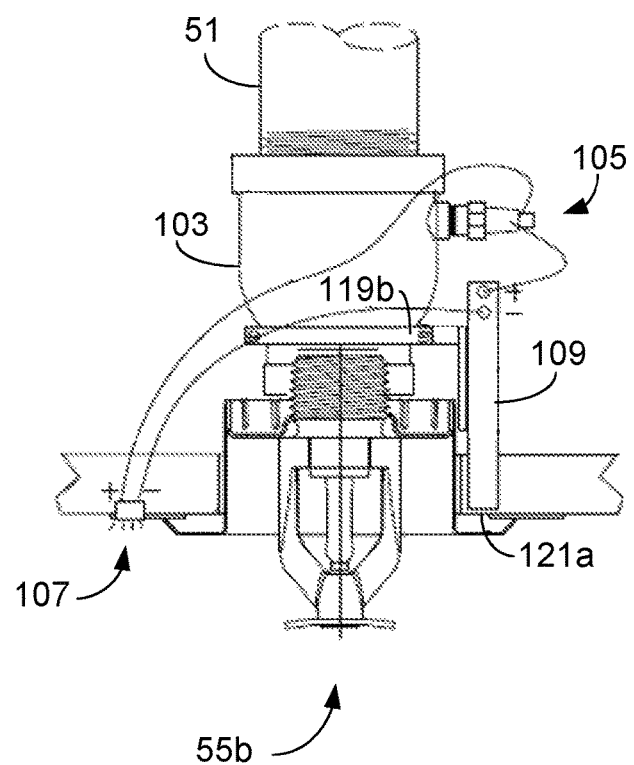
FIG. 5 is an alternate side view of the pressure indicating fire sprinkler device of FIG. 1, connected to an exemplary recessed sprinkler.

Referring now also to FIG. 5, an alternate side view of the pressure indicating fire sprinkler device 101 connected to a recessed sprinkler 55*b* is illustrated. Here, power source 109 is in communication with attachment device 119*b*. Power source 109 is orientated adjacent to recessed sprinkler 55*b* and adjacent to adapter 103. Attachment device 119b is configured to locate power source 109 near battery access point 121b.

It is understood that the pressure indicating sprinkler system can also be configured to work with any other manufactured sprinkler assembly, including pendent and upright sprinkler assemblies (not shown).

Figure 6:
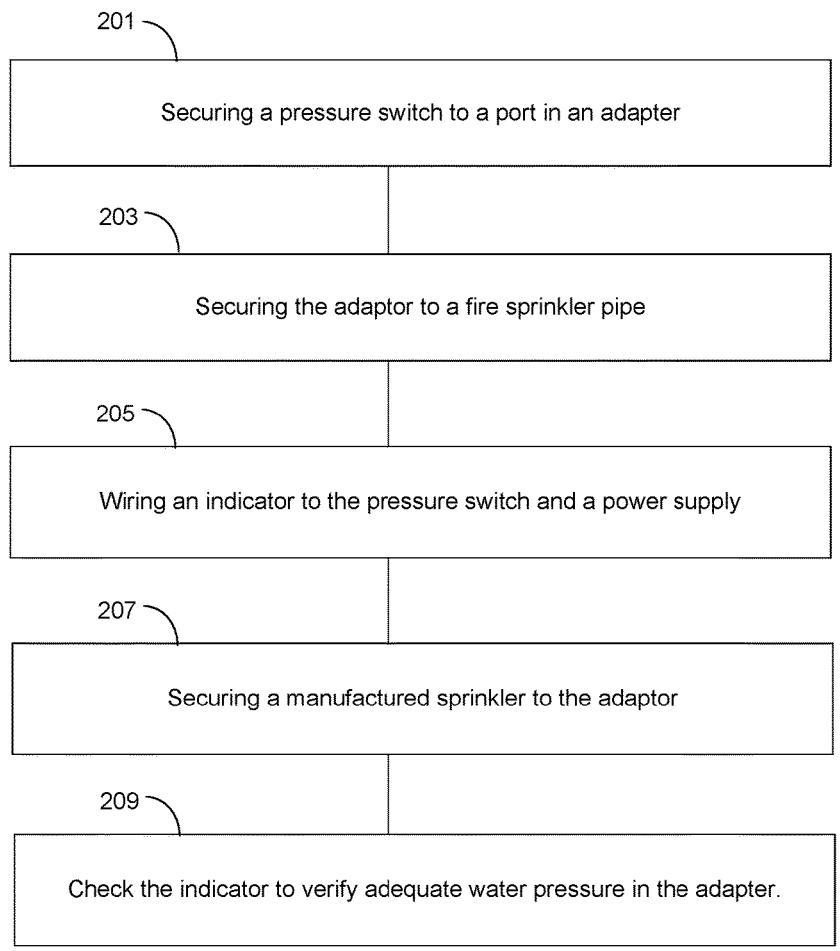
FIG. 6 is a flow chart for the use of the pressure indicating fire sprinkler device of FIG. 1.

Referring now also to FIG. 6, a chart demonstrating the method for operation of the pressure indicating fire sprinkler device. Secure a pressure switch to a port in an adapter, step 201. Secure the adapter to a sprinkler pipe, step 203. Wire a power supply, an indicator, and the pressure switch together, step 205. Secure a manufactured sprinkler to the adaptor, step 207. It is understood that these steps are interchangeable and may be performed in any order, as needed during installation. Check the indicator to verify that the fluid pressure in the adapter meets the specifications of the manufactured sprinkler, step 209. It is understood that the indicator will provide a visual or audible signal if there is adequate or inadequate fluid pressure in the adapter.

The current application has many advantages over the prior art including at least the following: (1) the water pressure is measured at each sprinkler assembly; (2) measuring the water pressure at the sprinkler assembly, instead of at a water supply pipe, provides an accurate assessment of specific sprinkler assembly's ability to function within specifications if there is a fire, and ability of the sprinkler systems ability to fight a fire in general; and (3) The indicator at each sprinkler assembly makes checking the pressure is quick.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A pressure indicating sprinkler assembly, comprising:
    an adapter;
    a pressure switch is releasably coupled to the adapter, the pressure switch configured to measure pressure within the adapter;
    an indicator in electrical communication with the pressure switch, wherein the indicator is configured to provide a notification corresponding to the measured pressure in the adapter;
    a power source which provides power to the pressure switch and the indicator; and
    a ceiling plate configured to cover a portion of the power source from view, the ceiling plate includes an aperture to permit inspection of the indicator.

2. The device of claim 1, wherein the ceiling plate releasably coupled to the indicator.

3. The device of claim 1, wherein the adapter connects a sprinkler pipe with a manufactured sprinkler.

4. The device of claim 1, wherein the pressure switch provides a signal to the indicator representing a fluid pressure level at or above an operational set point.

5. The device of claim 4, wherein the notification is at least one of an audible and a visual notification.

6. The device of claim 1, wherein the pressure switch provides a signal to the indicator representing a fluid pressure level below an operational set point.

7. The device of claim 6, wherein the notification is at least one of an audible and a visual notification.

8. The device of claim 1, wherein the notification is at least one of an audible and a visual notification.

9. The device of claim 8, wherein the notification is a light.

10. The device of claim 8, wherein the notification is a numerical display.

11. The device of claim 1, wherein the power source is a direct current.

12. The device of claim 11, wherein the power source is a battery.

13. The device of claim 12, wherein the battery is rechargeable.

14. The device of claim 1, wherein the power source is an alternating current.

15. A method for using a pressure indicating sprinkler assembly, comprising:
    securing a pressure switch to a port on an adapter, the pressure switch configured to measure pressure within the adapter;
    securing the adapter to a sprinkler pipe;
    securing the adapter to a manufactured sprinkler;
    checking an indicator in electrical communication with the pressure switches power source providing power to the indicator and the pressure switch, the indicator configured to verify sufficient fluid pressure in the adapter to meet the specifications of the manufactured sprinkler; and
    applying a ceiling plate configured to cover a portion of the power source from view, the ceiling plate includes an aperture to permit inspection of the indicator.

16. The method of claim 15, further comprising:
    wiring an indicator to the pressure switch and a power supply.

* * * * *